United States Patent
Olmo et al.

(10) Patent No.: US 9,557,953 B2
(45) Date of Patent: Jan. 31, 2017

(54) PRIVATE IMAGE VIEWER

(71) Applicant: Intel Corporation, Santa Clara, CA (US)

(72) Inventors: Ramon Cancel Olmo, Hillsboro, OR (US); Shawn Lee, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/566,417

(22) Filed: Dec. 10, 2014

(65) Prior Publication Data
US 2016/0170700 A1    Jun. 16, 2016

(51) Int. Cl.
*G09G 5/00*    (2006.01)
*G06F 3/14*    (2006.01)
*G06F 3/0488*    (2013.01)
*G06F 3/0481*    (2013.01)

(52) U.S. Cl.
CPC ........... *G06F 3/1423* (2013.01); *G06F 3/0481* (2013.01); *G06F 3/0488* (2013.01)

(58) Field of Classification Search
CPC .. G09C 5/00; G09G 2354/00; G09G 2340/14; H04L 9/12
See application file for complete search history.

(56) References Cited

U.S. PATENT DOCUMENTS

| | | | | |
|---|---|---|---|---|
| 5,790,818 A | * | 8/1998 | Martin | G06F 3/0481 709/205 |
| 8,310,508 B2 | * | 11/2012 | Hekstra | G09G 3/3611 345/690 |
| 2006/0221067 A1 | * | 10/2006 | Kim | G06F 21/84 345/204 |
| 2009/0083850 A1 | * | 3/2009 | Fadell | G06F 21/316 726/19 |
| 2011/0321143 A1 | * | 12/2011 | Angaluri | H04N 9/3194 726/6 |
| 2013/0103943 A1 | * | 4/2013 | Hirsch | G09C 5/00 713/168 |

OTHER PUBLICATIONS

Kwak, et al., "Electroactive Privacy Layer of a Display Device", U.S. Appl. No. 14/581,602, filed Dec. 23, 2014, pp. 1-27.

* cited by examiner

*Primary Examiner* — Kwin Xie
(74) *Attorney, Agent, or Firm* — International IP Law Group, P.L.L.C.

(57) ABSTRACT

Techniques related to viewing a private image are described herein. The techniques may include a public device including a processor and a public display to display a display image. The techniques may also include an input receiver to receive input at the public device, and a privacy controller to alter the display image from the public display when the display image is private. Techniques may further include a transmitter to transmit the display image to a private device when the display image is private.

23 Claims, 8 Drawing Sheets

PRIVATE IMAGE VIEWER

TECHNICAL FIELD

This disclosure relates generally to techniques for viewing a private image. Specifically, this disclosure relates to a removing a private image from a public screen to instead be viewed privately.

BACKGROUND ART

Computing devices can include displays used to visually display documents, videos, images, and other types of data. Mechanisms for viewing images on personal computing devices may not always be a private experience as a person may view an image on a personal device without the primary user granting permission. For example, an additional person could look over the shoulder of the user, the user may be using a personal device in a crowded space and expose what the user is viewing to other people.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The present disclosure relates generally to techniques for implementing a private image viewing. As discussed above, mechanisms for viewing images on personal computing devices may not always be a private experience as a person may view an image on a personal device without the primary user granting permission. In some cases, a person could look over the shoulder of an individual using a personal device in a crowded space thereby expose what the user is viewing to other people. The techniques described herein include methods, devices, and systems to enable a user to view an image or other display data in a private way enabling content to be viewed exclusively by a target user.

The techniques described herein may include a public device with a public display and a private device with a private display. The display image on the public display may be removed from the public display and transmitted to the private display to be displayed privately. Further, in some embodiments, the public display may include input, such as a touch screen, that continues to receive and transmit instructions based on input received while the display image is only being displayed privately on the private display of the private device. In some examples, the public device and public display are only temporarily inactive, the display image removed, or the display image altered depending on the time a display image is private.

In another example, private viewing of an image may include a public device with a public display that includes a number of privacy pixels, and also a private device with a private display and a detector to detect the number of privacy pixels. In this example, the number of privacy pixels may display an image that is private in a way that is not detectable to the human eye, but that is detectable by the detector of the private device. In this example, the private device may include a detector to detect the number of privacy pixels, then convert and display the detected pixels on the private display in a way that is visible to the human eye.

Figure 1:
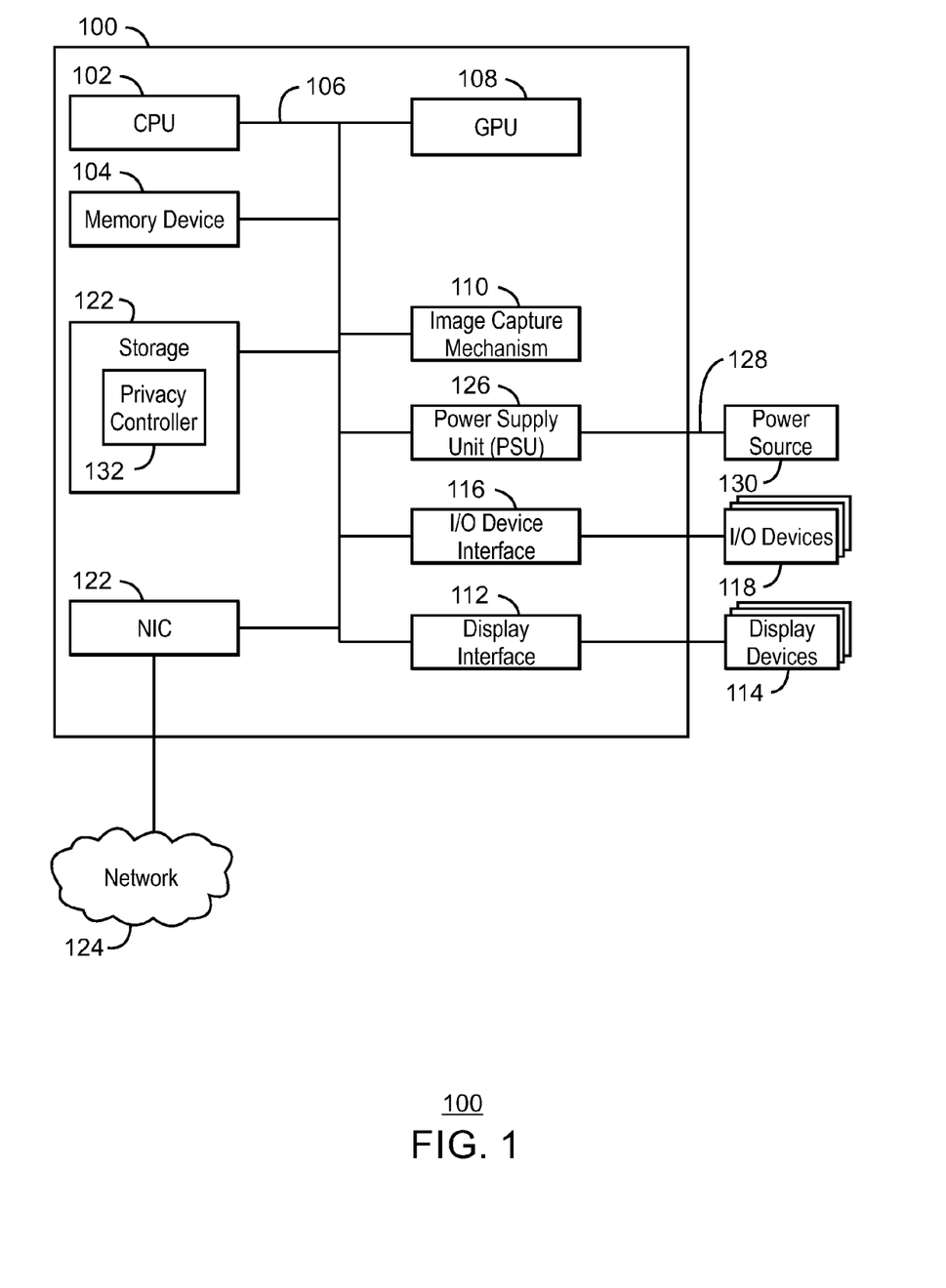
FIG. 1 is a diagram illustrating an example of a computing device to implement the privacy techniques discussed herein.

FIG. 1 is a diagram illustrating an example of a computing device 100 to implement the privacy techniques discussed herein. The computing device 100 may be, for example, a laptop computer, desktop computer, ultrabook, tablet computer, mobile device, or server, among others. The computing device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the computing device 100 may include more than one CPU 102.

The computing device 100 may also include a graphics processing unit (GPU) 108. As shown, the CPU 102 may be coupled through the bus 106 to the GPU 108. The GPU 108 may be configured to perform any number of graphics functions and actions within the computing device 100. For example, the GPU 108 may be configured to render or manipulate graphics images, graphics frames, videos, or the like, to be displayed to a user of the computing device 100.

The memory device 104 can include random access memory (RAM), read only memory (ROM), flash memory, or any other suitable memory systems. For example, the memory device 104 may include dynamic random access memory (DRAM). The computing device 100 includes an image capture mechanism 110. In some examples, the image capture mechanism 110 is a camera, stereoscopic camera, scanner, infrared sensor, or the like.

The CPU 102 may be linked through the bus 106 to a display interface 112 configured to connect the computing device 100 to one or more display devices 114. The display device(s) 114 may include a display screen that is a built-in component of the computing device 100. Examples of such a computing device include mobile computing devices, such as cell phones, tablets, 2-in-1 computers, notebook computers or the like. The display devices 114 may also include a computer monitor, television, or projector, among others, that is externally connected to the computing device 100. In some cases, the display devices 114 may be head-mounted display devices having a display capacity via projection, digital display, filtering incoming light, and the like.

The CPU 102 may also be connected through the bus 106 to an input/output (I/O) device interface 116 configured to connect the computing device 100 to one or more I/O devices 118. The I/O devices 118 may include, for example, a keyboard and a pointing device, wherein the pointing device may include a touchpad or a touchscreen, among others. The I/O devices 118 may be built-in components of the computing device 100, or may be devices that are externally connected to the computing device 100. In some cases, the I/O devices 118 are touchscreen devices integrated within a display device, such as one or more of the display devices 114.

The computing device 100 may also include a storage device 120. The storage device 120 is a physical memory such as a hard drive, an optical drive, a thumbdrive, an array of drives, or any combinations thereof. The storage device 120 may also include remote storage drives. The computing device 100 may also include a network interface controller (NIC) 122 may be configured to connect the computing device 100 through the bus 106 to a network 124. The network 124 may be a wide area network (WAN), local area network (LAN), or the Internet, among others.

The computing device 100 and each of its components may be powered by a power supply unit (PSU) 126. The CPU 102 may be coupled to the PSU through the bus 106 which may communicate control signals or status signals between then CPU 102 and the PSU 126. The PSU 126 is further coupled through a power source connector 128 to a power source 130. The power source 130 provides electrical current to the PSU 126 through the power source connector 128. A power source connector can include conducting wires, plates or any other means of transmitting power from a power source to the PSU.

The computing device 100 may also include a privacy controller 132 located on the storage 120 to control the display of private images. In some examples, the privacy controller 132 may control the display of images that are private so that the computing device 100 does not display them on a display device 114, if that device is public. In some examples, the privacy controller 132 may instead transmit the display image to a separate device that is a private device, where the private device would display the image when the image is private. The privacy controller 132 may also ensure the I/O devices 118 continue to receive input at the computing device 100 even if the display devices 114 connected to the computing device 100 are not displaying a display image.

The block diagram of FIG. 1 is not intended to indicate that the computing device 100 is to include all of the components shown in FIG. 1. Further, the computing device 100 may include any number of additional components not shown in FIG. 1, depending on the details of the specific implementation.

Figure 2:
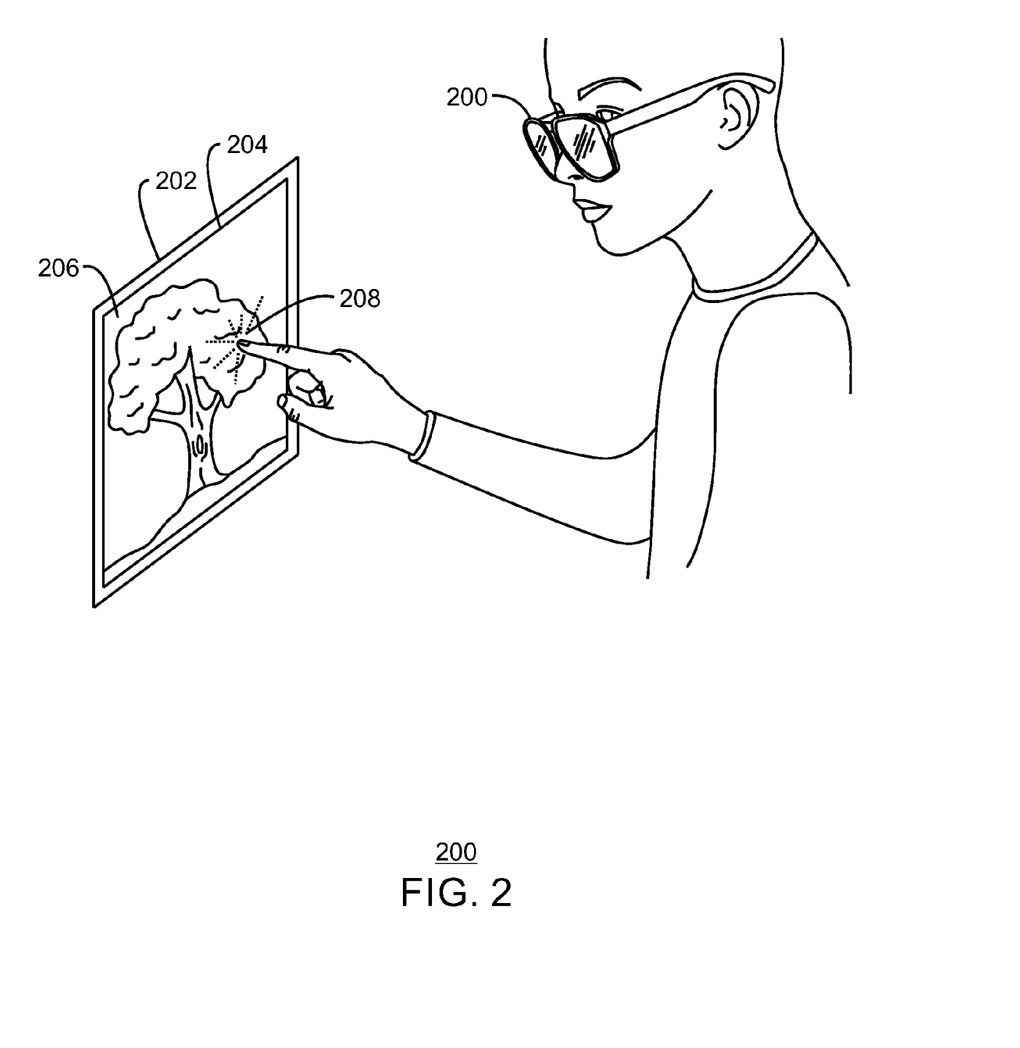
FIG. 2 is a diagram illustrating an example environment for using the privacy techniques and devices discussed herein.

FIG. 2 is a diagram illustrating an example environment for using the privacy techniques and devices 200 discussed herein. A wearable privacy device 200 is shown as one example of a device for displaying images that are private. In some examples, wearable privacy device 200 may be a head-mounted privacy device that may be transparent, translucent, or opaque. In some examples the wearable privacy device 200 may also include a head-mounted display to display the display image when the display image is private. In FIG. 2, a user is shown wearing the wearable privacy device 200 while operating a public device 202. The public device, may be computing device, such as the computing device 100 having a privacy controller 132 as discussed above in FIG. 1. The public device 202 may be a device that includes a public display 204 to display images 206.

In some examples, an image can be seen by another user, other than the primary user, from the display 204 is considered public. In some examples, when a display image 206 is public it may be displayed on a public display 204 of a public device 202. When a display image is 206 is private, the display image 206 may be removed from the public display 204 of the public device 202, any may instead be transmitted to the wearable privacy device 200 for private display to the user.

A touch screen input 208 may overlap, or be integrated, with the area of the public display 204 and may be used to receive input from a user. The touch screen input 208 may continue to operate even when the public display 204 is not displaying a display image 206, and instead the display image 206 is sent to the wearable privacy device 200. In other examples, the touch screen input 208 may continue to receive input from a user even if the public display 204 is powered off. This ability may allow a user to interact with a display image 206 that is being displayed privately on the wearable privacy device 200 without the use of an additional input device. Further, the wearable privacy device 200 allows the viewing of a display image 206 that is private without the use of a polarizing filter applied to the public display 204 that may render the touch display input 208 less functional. As touchscreens become widely used, the techniques described herein enable touchscreen functionality to be preserved while privacy viewing is enabled.

Figure 3:
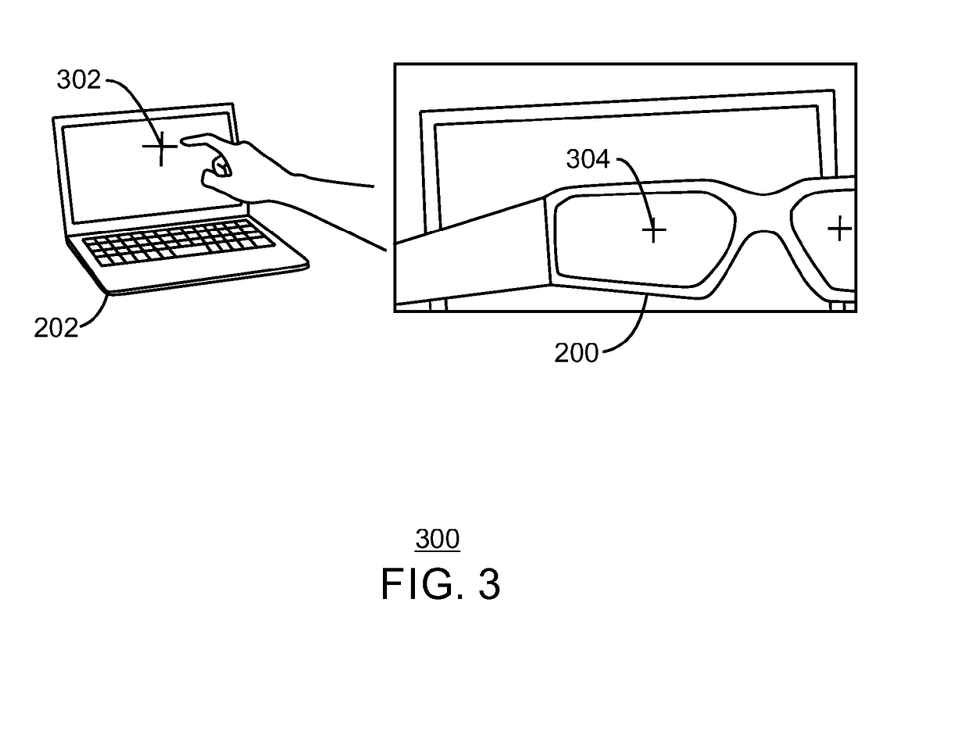
FIG. 3 is a diagram illustrating an example of one feature of a privacy device.

FIG. 3 is a diagram illustrating an example of one feature of a privacy device 300. Like numbered items are as described for FIG. 2. One feature of a privacy device 300 includes a public display touch cursor 302 that may indicate the location of an input by a user. In some examples, the public display touch cursor 302 may indicate the location a user touched a display of a public device 202. The wearable privacy device 200 may also show an input cursor 304 to indicate the location of input on the public device 202 by a user. The input cursor 304 may be used, in some examples, when the wearable privacy device 200 is translucent or opaque. The hovering touch capability that may be enabled by this input cursor may aid use of the wearable privacy device 200 for a user who cannot easily see their fingers through the private device. In some examples where the user cannot see the public device 202 clearly, it may be difficult for the user to provide input to a touch screen input 208. The input cursor 304 may be displayed or projected with a display image 206 when the display image 206 is private and being displayed on the wearable privacy device 200.

Figure 4:
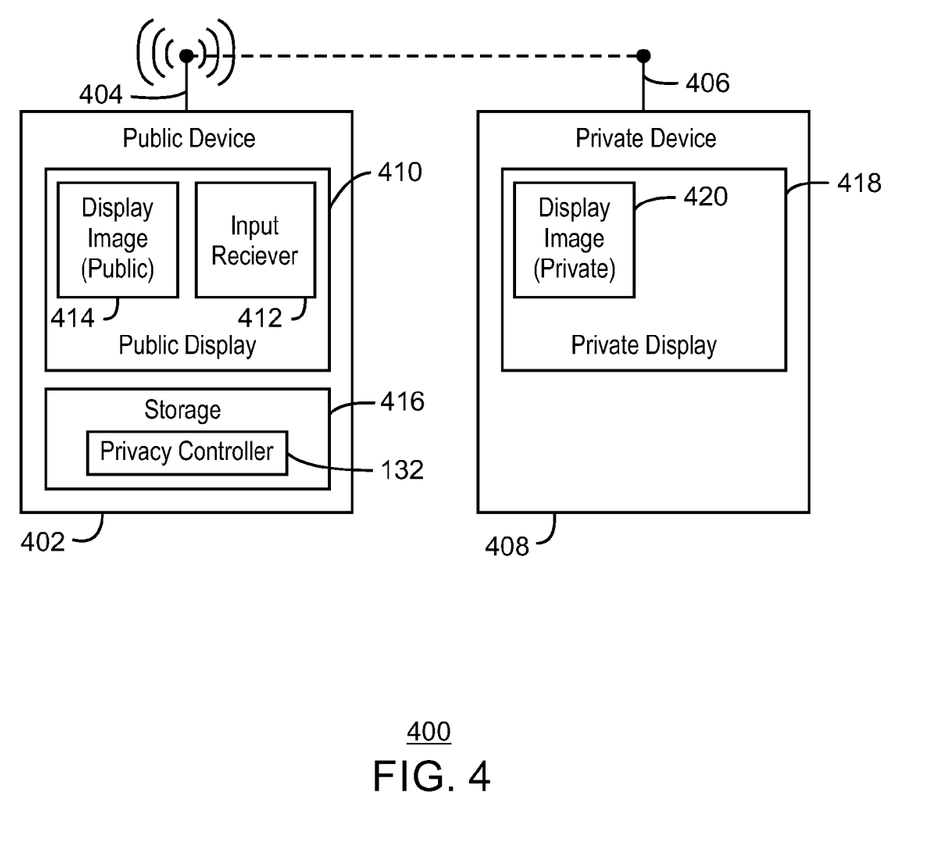
FIG. 4 is a diagram illustrating an example system for private image viewing.

FIG. 4 is a diagram illustrating an example system 400 for private image viewing. The system 400 may include a public device 402 that may be a computing device, such as the computing device 100 of FIG. 1. The public device 402 may be used by a user and viewed by additional people via a public display 410 who are not using the public device 402. The public device 402 may include a transmitter 404 to transmit data from a receiver 406 on a private device 408. The transmission from the transmitter 404 to the receiver 406 may be wireless or wired. The transmission from the transmitter may also be through a wireless protocol such as Wi-Fi, or wireless display (WiDi), Bluetooth, wireless Universal Serial Bus (USB) or any other transmission means for transmitting data. Alternatively, wired transmission is also possible through High-Definition Multimedia Interface (HDMI), Thunderbolt, Display Port, USB, or other suitable wired means.

The public device may also include the public display 410 for displaying images, text, documents, video, or any other visual data on the public device. In some examples, the public display may be viewed by more than one person. Specifically, in some examples, the public display 410 may be viewed by someone who is not a user of the public device 402. The public display 410 may receive input from an input receiver 412. This input receiver may be a touch screen to receive tactile input from a user and may also be another means of input including touch tablet surface or surfaces, a trackpad, video motion capture, or any other suitable means of input for a computing device.

The public device 402 may also include storage 416. The storage 416 is a physical memory such as a hard drive, an optical drive, a thumbdrive, an array of drives, or any combinations thereof. In some examples the storage 416 may also include a memory device such as random access memory (RAM), read only memory (ROM), flash memory, dynamic random access memory (DRAM), or any other suitable memory systems. The storage 416 may store a privacy controller, such as the privacy controller 132 of FIG. 1. The privacy controller 132 may direct the public display 410 whether or not to display a display image 414 based on whether or not the display image 414 is a public or private image. In some examples, the privacy controller 132 may direct the public display 410 to power off when the display image is private 414. The privacy controller 132 may also instruct the public display 410 to blur any aspects of a display image 410 that are private to generate a blurred display image, when the display image 414 contains both public and private components. In some examples the privacy controller 132 may instruct the display image 414 be transmitted from the public device 402 with the transmitter 404 and received by the private device 408 with the receiver 406.

The private device 408 may further include a private display 418 and to show a display image 420 when it is private. The private device 408 may be any device which allows only the user to see the private display 418. In some examples, the private device 408 may be glasses, a headset with an attached screen that may display or project images, or a device that is not worn on the head but is only active when viewed within a certain proximity to a user's eyes. In some examples, the private device 408 may be a mobile computing device that is modified to only be viewed by a single user. The private display 418 may be any display such as a screen of light emitting diodes or any suitable image emitting screen, but may also include a projection of an image and a space for the image to be projected.

Figure 5:
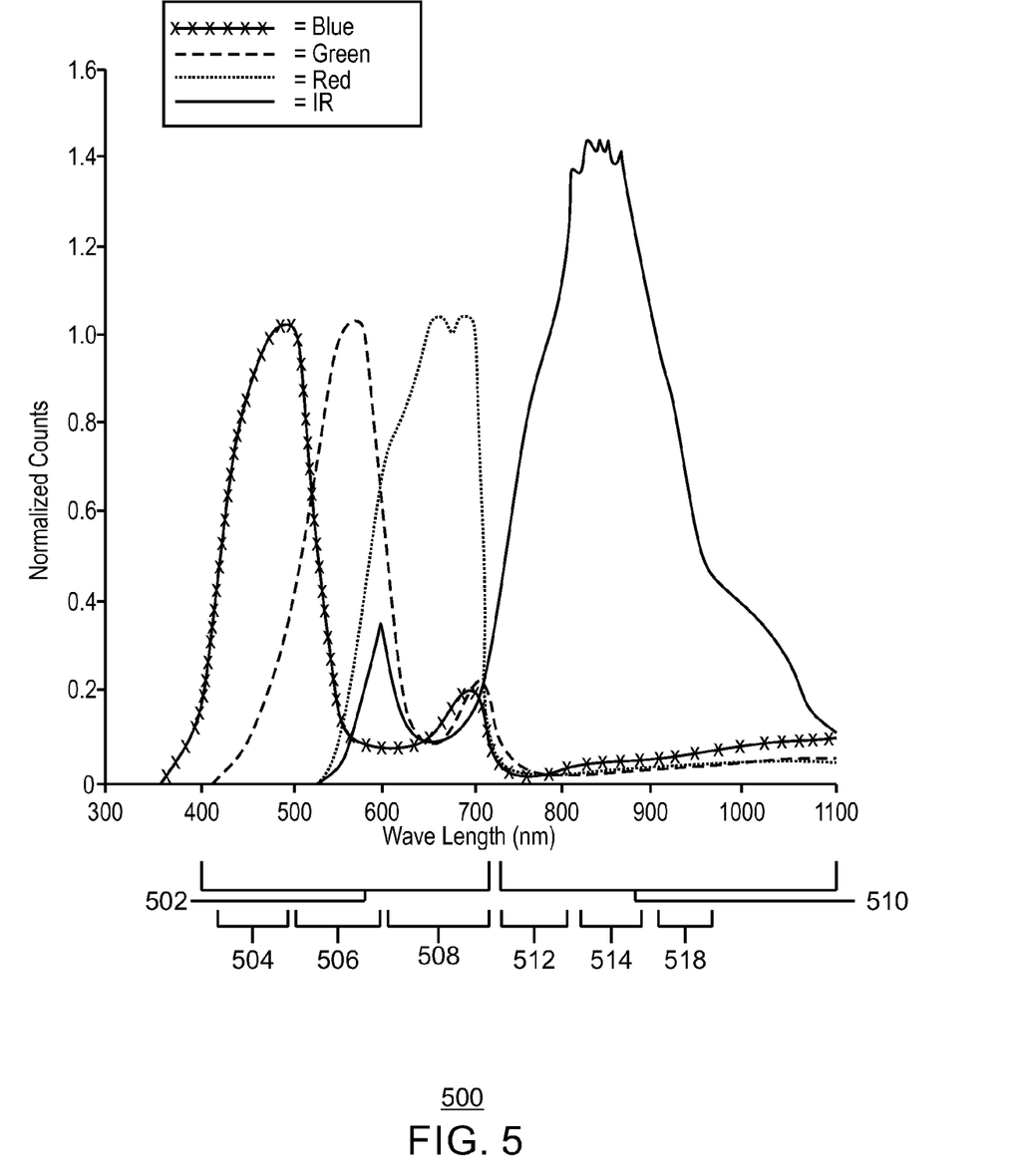
FIG. 5 is a block diagram illustrating an example mapping on an intensity spectrum that may be used in one technique for private viewing of an image.
Figure 6:
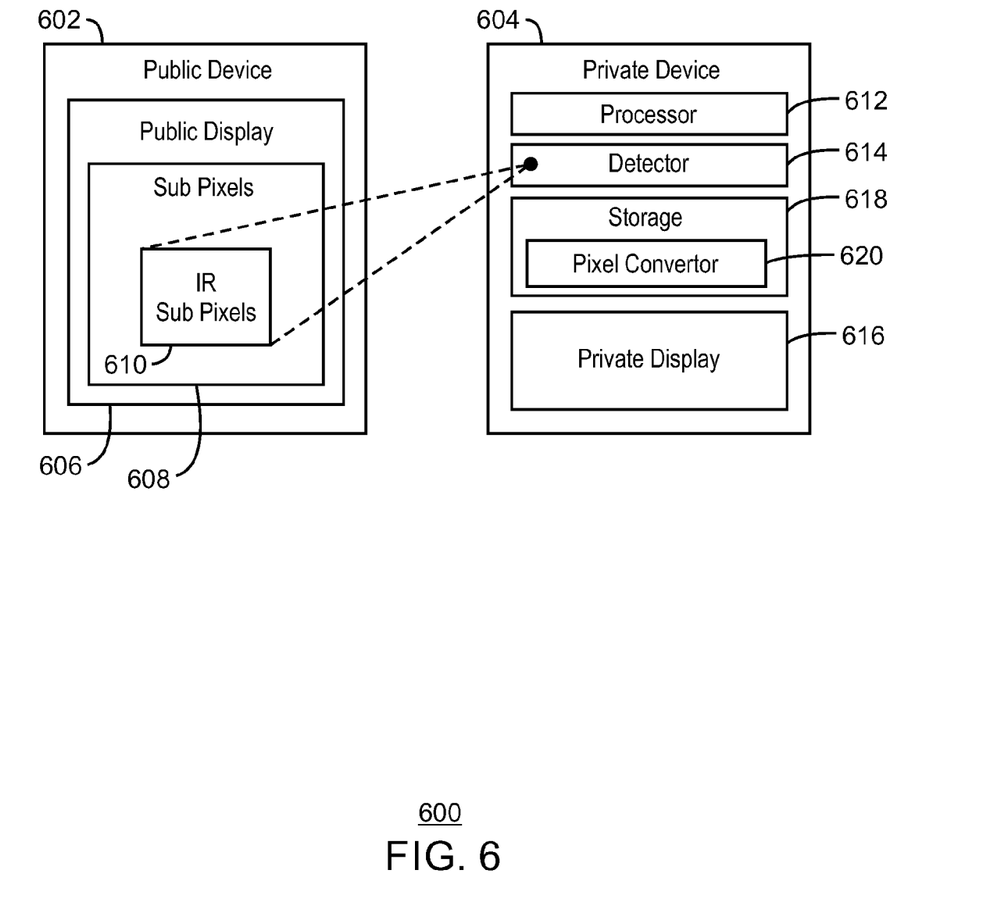
FIG. 6 is a block diagram illustrating an example system for private image viewing.

FIG. 5 is a block diagram illustrating an example mapping on an intensity spectrum 500 that may be used in one technique for private viewing of an image. In some examples, a display image that is private 420 may be sent to a private display 418 in a mechanism other than direct transfer from a transmitter 402 to a receiver 406. Specifically, some examples may include image data that is transferred through nonvisible display by a public display 410 and later detection by a private device 418. One example of this technique is shown in FIG. 6. One example of this mechanism may make use of mapping signals for visible light to nonvisble wavelengths as detailed herein.

The spectrum of visible light 502 includes electromagnetic waves with wavelengths of roughly 400-700 nanometers (nm). Current display technology may make use of color filters within the visible spectrum region, for example Liquid-Crystal Displays (LCD). An LCD display panel, for example, may use Red, Green and Blue color filters at varying intensities for visible color reproduction for all color ranges for display images. In FIG. 5, each color displayed by a device display may correspond to a particular wavelength peak in the visible spectrum 502, e.g. Blue 504 corresponds to an intensity peak at 450 nm, Green 506 corresponds to an intensity peak at 550 nm, and Red 508 corresponds to an intensity peak at 650 nm. Light signals at wavelengths longer than roughly 700 nm are considered to be in an infrared region 510 of light that is not visible to the human eye, but may be detectable by an infrared detector. Accordingly, a display enabled to emit infrared signal through its display may be able to transmit data such as image data to a private device 408 with nonvisible light.

In some examples, data for images in Red 508, Green 506, and Blue light 504 may be emitted through publicly visual channels in varying intensities and combinations to display images of all colors. The same information can be emitted in a private way if nonvisible wavelengths are used instead. For example a public device emitting an electromagnetic wave from a display at wavelengths of 750 nm, 850 nm, and 950 nm would all be undetectable to the human eye, but would be detectable to a detector for radiation in the infrared wavelength range 510. In some examples, varying intensities of visible Blue light 504 to emit could be mapped to a mapped infrared Blue region 512 at 750 nm. Varying intensities of visible Green light 506 could be mapped to a mapped infrared green region 514 at 850 nm. Varying intensities of visible Red light 508 could be mapped to a mapped infrared Red region 518 at 950 nm.

Using these color mappings, a public device may convert a display image to its component parts of Red 508, Green 506, and Blue 504 color. Rather than displaying these visible colors, the public device may convert each of these component colors to mappings in the invisible infrared wavelength region 510 in varying intensities. A private device may detect the invisible emissions by a public device and convert the invisible wavelength intensities for each color back to the respective wavelengths in visible spectrum. The private device may then display the display image in the visible spectrum on a private display. Further, as a public device may scramble or encode a private image, a private device may include a privacy image descrambler or privacy image decoder to descramble or decode respectively a private image.

FIG. 6 is a block diagram illustrating an example system 600 for private image viewing. The example system 600 for private image viewing that is shown may make use of techniques discussed with regard to FIG. 5.

Some examples of the system 600 include public device 602 that may display an invisible image for detection by a private device 604 to show visibly but privately. The public device 602 may include a public display 606 to display both a visible and an invisible image. The public display 606 may further include sub pixels 608 that emit light waves to display both public and private images. Each sub pixel 608 may represent a physical point in an image and may also represent a particular color within that physical point of an image to be displayed. The lighting source for each sub pixel 608 could include light emitting diodes (LEDs), liquid-crystal display (LCD), or plasma displays. The pixel structure may further include modification of LCD pixel structure formats including RGBW or Pentile. In some examples, the sub pixels 608 may include a number of infrared (IR) Sub pixels 610 to emit light in the infrared spectrum. IR Sub pixels 610 may include infrared wavelengths, but in other example may emit light in other non-visible signals such as non-visible wavelengths for a private device 604 to receive. In some examples, these non-visible signals may be used to display non-visible private images. In some examples, the IR sub pixel 610 may be included with a white sub pixel where applicable to the pixel structure to provide signal in infrared wavelengths as well. In some examples of backlight design, by adding IR LED with white LED, LCD backlight may be capable to send IR light to each sub pixels of LCD panel in parallel to white light.

When a public device 602 determines that a display image, or a portion of a display image, should not be shown publicly, the public device 602 may instruct the public display 606 to emit the private image data for that display image using IR Sub pixels 610 rather than Sub pixels 608 using visible light.

The system 600 may further include a private device 604 to including a processor 612 and a detector 614 to detect and process received visible and invisible light. In some examples, the detector 614 of the private device 604 may detect light from both the Sub pixels 608 and the IR Sub pixels 610 from a public device 602. In some examples, in order to detect an IR image out of an IR sub pixel or a white sub pixel with an IR sub pixel included, a detector may use an IR camera to include a Charge Couple Device (CCD) or Complementary Metal-Oxide-Semiconductor (CMOS) image sensor that covers IR spectrum zone.

The private device 604 may also include a private display 616 that can project an image, display an image on a digital screen, or may use any other means to suitably render images, videos, document, or other digital data in a way visible to the human eye.

The private device may also include a storage 618 for the storage of data, modules, software instructions or any other data to be stored or used by the private device 604. In some examples the storage 618 of the private device 604 may include a pixel converter 620. The pixel converter 620 may convert signal detected by the detector 614 to a corresponding visible light. In some examples, the private display 616 may show a visible image generated by conversion of the detected IR sub pixel signal by the pixel converter 620.

Figure 7:
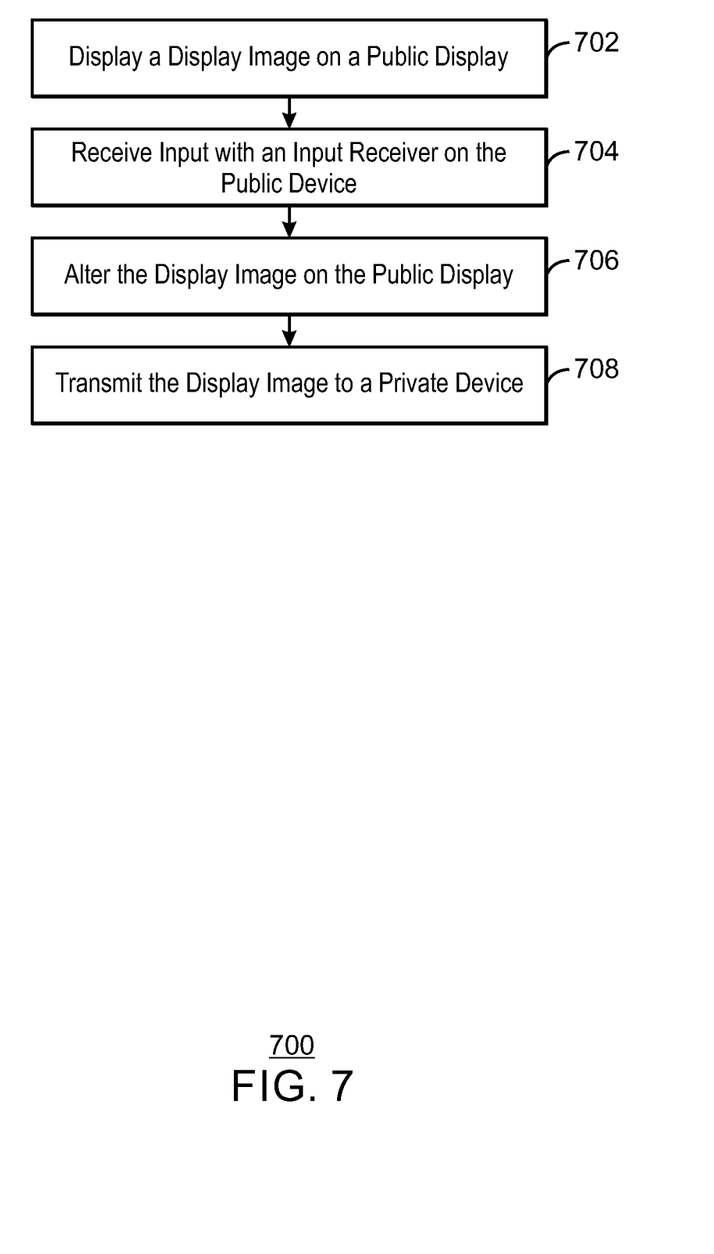
FIG. 7 is a block diagram illustrating an example method for private image viewing.

FIG. 7 is a block diagram illustrating an example method 700 for private image viewing. In one example of private image viewing, the method begins at block 702.

At block 702, a display image may be displayed on a public display. This image may include an image that is not private and may be the normal operation for a device capable of the presently disclosed techniques. The public device may be one device of several in a system to also include a private device. The public device may display the display image on a public display, or a display that is viewable to the public. The display does may not be intended to be viewed by the public, but may be used in a location or way that a person other than the viewer may intentionally or unintentionally view it even though not operating the public device. The private device may include a private display to display a display image to a user exclusively.

At block 704, input is received with an input receiver on the public device. As explained above, this input may take a variety of forms including input received on a touch pad that overlaps with the area of a public display. In some examples this input may be received throughout the entire process even if the public device is no longer displaying a readable or intelligible display image.

At block 706, the display image may be altered on the public display to occlude the display image when the display image is private. The altering of the display image may take the form of simply powering the public display off, but may also take the form of removing only the part of the display image that is private, or the private data, so the private part may not be overseen or understood by a public observer thus generating a partial display image. In some examples, a replacement image that is publicly displayable may be displayed instead of the private image. In some examples, the a display image may be blurred or altered in another way to occlude the image, video or render the text unreadable depending on the particular image that is being displayed.

At block 708, the display image may be transmitted to a private device. The transmission may take the form of a wireless or wired transmission and may follow any suitable protocol including Wi-Fi, wireless display WiDi protocol, and Bluetooth. In some examples a determination has been made that the display image being displayed is private and should only be viewable on the private device. The display image transferred to the private device may be displayed either via projection to a private display, shown on a digital screen, or any other display for showing images, text, video, or other visual data.

Figure 8:
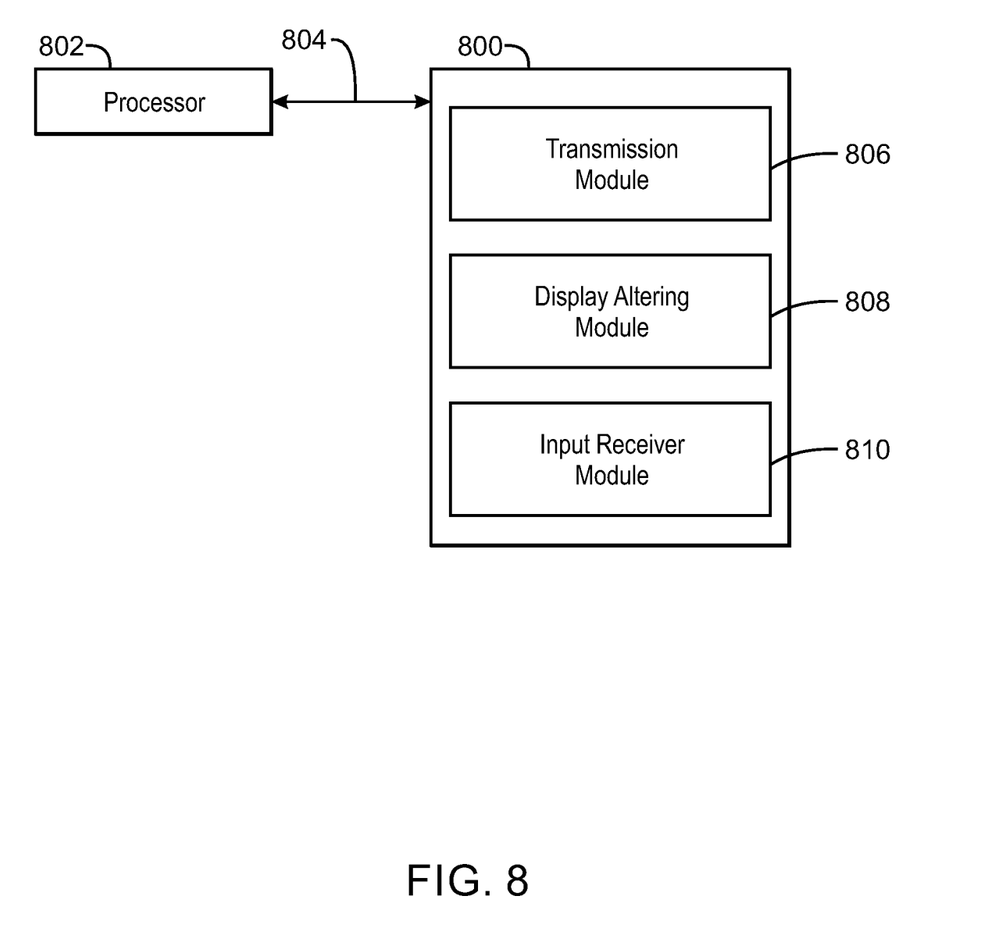
FIG. 8 is a block diagram illustrating an example of a tangible, machine-readable medium for implementing private image viewing.

FIG. 8 is a block diagram illustrating an example of a tangible, machine-readable medium 800 for implementing private image viewing. The machine-readable medium may be connected to a process 802 by a bus 804. The processor 802 may be a single core processor, a multi-core processor, a computing cluster, or any number of other configurations. The bus 804 may link and allow the transmission of data between the processor 802 and the machine-readable medium 800. The machine-readable medium 800 may be a non-transitory machine-readable medium, a storage device configured to store executable instructions, or any combination thereof. In any case, the machine-readable medium 800 is not configured as a wave or signal.

The machine-readable medium 800 may include a transmission module 806, to transmit a display image from a public device to a private device if the display image is private. The display image may not be stored on the machine-readable medium 800. The machine-readable medium may also include a display altering module 808 to alter the public display of the public device. The display altering module 808 may only function during times when a display image is private and should be hidden from people others than the user on a public display. The display altering module 808 may instruct a public display to power off, or otherwise obscure through scattering, smudging, distorting, dimming, replacing, and a display image that is private. Other suitable methods may also be used to remove the display image from public sight when the image is private. The machine-readable medium may also include an input receiver module 810. The input receiver module 810 may include the capability to receive input from a user including tactile input through a touch sensitive screen, track pad, motion capture, peripheral input devices, or other suitable input mechanisms. The input receiver module 810 may receive input from mechanisms on the public device even though the display of a display image may be on the private device.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Not all components, features, structures, characteristics, etc. described and illustrated herein may be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein may not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the machine-readable medium described herein. Furthermore, although flow diagrams and/or state diagrams may have been used herein to describe embodiments, the techniques are not limited to those diagrams or to corresponding descriptions herein. For example, flow may not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A system for viewing a private image, comprising:
    a public device comprising:
        a processor;
        a public display to display a display image comprising a public image and a private image;
        an input receiver to receive input at the public device; and
        a transmitter to transmit the display image to a private device through the public display wherein the public image is to be transmitted with red, green, blue (RGB) subpixels and the private image is to be transmitted with a white subpixel.

2. The system for viewing a private image of claim 1, wherein the private device comprises:
    a receiver to receive the display image; and
    a private display to display the display image when the display image is private.

3. The system for viewing a private image of claim 1, wherein the public display is turned off when the display image is private and transmitted to the private device.

4. The system for viewing a private image of claim 1, wherein the private device is a device wearable by a user.

5. The system for viewing a private image of claim 1, comprising altering the display image on the public display to display at least one of:
    a blurred display image at the public display when the display image is private;
    a partial display image wherein private data from the display image is altered when the display image is private; or
    a scrambled display image at the public display when the display image is private.

6. The system for viewing a private image of claim 1, wherein the input receiver is a peripheral input device.

7. The system for viewing a private image of claim 1, wherein:
    the input receiver is a touch screen input integrated with the public display; and
    the touch screen input is to remain active.

8. The system for viewing a private image of claim 7, wherein the private display is to show an input cursor to indicate the location of a touch screen input received on the touch screen input.

9. The system for viewing a private image of claim 1, wherein the private device is a head-mounted display.

10. The system for viewing a private image of claim 9, wherein:
    the private display is at least one of translucent or opaque; and
    when the display image is private, the private display is to:
        project the display image onto a surface of the private display;
        displays the display image on a digital screen; or
        any combination thereof.

11. The system for viewing a private image of claim 1, comprising a detector on the private device for detecting at least one of:
    the public display; and an environment around the public display, wherein the private device is to display on the private screen the environment when the private device is opaque.

12. The system for viewing a private image of claim 1, wherein:
the altering of the display image is to combine an image that is public with a non-visible private image; and
the transmitter is to transmit the display image through the public display to the private device using a non-visible signal.

13. The system for viewing a private image of claim 1, wherein:
the display image is scrambled prior to display;
the private device further comprises at least one of a privacy image decoder or a privacy image descrambler; and
the private device is to detects, decodes, and visibly displays the non-visible image on a private display.

14. A method for viewing a private image, comprising:
displaying a display image comprising a public image and a private image on a public display, wherein a public device comprises the public display, and a private device comprises a private display;
receiving input with an input receiver on the public device, wherein the input is to control the public device, the private device, and the display image; and
transmitting the display image to a private device through the public display wherein the public image is to be transmitted with red, green, blue (RGB) subpixels and the private image is to be transmitted with a white subpixel.

15. The method of claim 14, comprising displaying the display image on the private display, when the display image is private.

16. The method of claim 14, wherein the public display is turned off when a when the display image is private and transmitted to the private device.

17. The method of claim 14, wherein:
the input receiver is a touch screen input integrated with the public display; and
the touch screen input remains active when the public display is no longer displaying the display image when the display image is private.

18. The method of claim 14, wherein the private device is a head-mounted display and when the display image is private, the method further comprising:
projecting the display image onto a surface of the private display;
displaying the display image on a digital screen of the private display; or
any combination thereof.

19. A non-transitory, machine accessible storage medium comprising instructions stored thereon that when executed on a machine to view a private image cause the machine to:
display a display image, comprising a public image and a private image, on a public display, wherein a public device comprises the public display, and a private device comprises a private display;
receive input with an input receiver on the public device, wherein the input is to control the public device, the private device, and the display image; and
transmit the display image to a private device through the public display wherein the public image is to be transmitted with red, green, blue (RGB) subpixels and the private image is to be transmitted with a white subpixel.

20. The non-transitory, machine accessible storage medium of claim 19 comprising instructions stored thereon that when executed on the machine to view a private image cause the machine to display the display image on the private display, when the display image is private.

21. The non-transitory, machine accessible storage medium of claim 19 wherein:
the input receiver is a touch screen input to overlap with the public display; and
the touch screen input remains active when the public display is no longer displaying the display image when the display image is private.

22. The non-transitory, machine accessible storage medium of claim 19 wherein the private device is a head-mounted display and when the display image is private, the private display is to:
project the display image onto a surface of the private display;
display the display image on a digital screen of the private display; or
any combination thereof.

23. The system for viewing a private image of claim 1, wherein the private image is to be transmitted with non-visible light in parallel with the white subpixel.

* * * * *